United States Patent [19]

Chou

[11] Patent Number: 5,241,015
[45] Date of Patent: Aug. 31, 1993

[54] COMPATIBILIZED POLYCARBONATE SYNDIOTACTIC VINYL AROMATIC POLYMER BLENDS

[75] Inventor: Chai-jing Chou, Missouri City, Tex.

[73] Assignee: The Dow Chemical Company, Midland, Mich.

[21] Appl. No.: 868,437

[22] Filed: Apr. 15, 1992

[51] Int. Cl.$^5$ .................... C08G 65/44; C08L 71/12; C08L 69/00; C08L 25/06
[52] U.S. Cl. .................... 525/391; 525/390; 525/394; 525/395; 525/133; 525/146
[58] Field of Search ............... 525/133, 146, 390, 391, 525/394, 395, 396, 397

[56] References Cited

U.S. PATENT DOCUMENTS

| | | | |
|---|---|---|---|
| 3,933,941 | 1/1976 | Yonemitsu | 525/146 |
| 4,446,278 | 5/1984 | Loucks | 525/146 |
| 4,746,708 | 5/1988 | Sybert | 525/397 |
| 4,914,153 | 4/1990 | Togo | 525/396 |

FOREIGN PATENT DOCUMENTS 747325  9/1970  Belgium ............... 525/390

*Primary Examiner*—David J. Buttner

[57] ABSTRACT

A compatibilizer polymer specially adapted for compatibilizing blends of aromatic polycarbonates and syndiotactic vinyl aromatic polymers, comprising the reaction product of a $C_{2-18}$ organic diamine compound and a polar group modified polyphenylene ether.

4 Claims, No Drawings

COMPATIBILIZED POLYCARBONATE SYNDIOTACTIC VINYL AROMATIC POLYMER BLENDS

BACKGROUND OF THE INVENTION

The present invention relates to a compatibilized blend of an aromatic polycarbonate resin and a syndiotactic vinyl aromatic polymer. Such compatibilized blends are usefully employed in the preparation of molded objects for applications requiring resistance to heat, as well as strength and impact resistant properties.

In EP-A 324,398 there are disclosed immiscible blends of syndiotactic vinyl aromatic polymers with numerous other polymers including polycarbonate. In addition, the reference disclosed that impact modifiers may be present in the composition, as well as special compatibilizers comprising rubbery grafted polymers. Despite the advance in the art obtained according to the teachings EP-A 324,398, improved compatibilizing agents are still desired, particularly in order to compatibilize such dissimilar materials as syndiotactic polystyrene and polycarbonate. Thus, there still exists a need in the art to prepare compatibilized blends comprising syndiotactic vinyl aromatic polymers and aromatic polycarbonates.

SUMMARY OF THE INVENTION

According to the present invention there is provided a compatibilizer polymer specially adapted for compatibilizing blends of aromatic polycarbonates and syndiotactic vinyl aromatic polymers, said compatibilizer comprising the reaction product of a $C_{2-18}$ organic diamine compound and a polar group modified polyphenylene ether.

Further according to the present invention there is provided a composition comprising:

(A) 90 to 10 percent by weight of a thermoplastic aromatic polycarbonate based on one or more diphenols corresponding to the formula

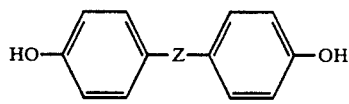

in which
Z is a single bond, a $C_1$-$C_{18}$ hydrocarbadiyl radical, —S—, —$SO_2$—, —CO— or —O—, having Mw of 15.000 to 200,000, (B) 10 to 90 percent by weight of syndiotactic vinylaromatic polymer having Mw of 20,000 to 400,000, and (C) 0.1 to 10 percent by weight of a compatibilizer comprising the reaction product of i) a $C_{2-18}$ organic diamine compound and ii) a polar group modified polyphenylene ether:
wherein the total of (A), (B) and (C) equals 100 percent.

DETAILED DESCRIPTION

Preferred diamines for use in preparing the compatibilizer according to the present invention are organic compounds containing one primary amine functionality which is reactive with the polar group of the polar group modified polyphenylene ether, and one diamine functionality which is reactive with the aromatic polycarbonate resin. Preferred diamines are aliphatic diamines containing one primary amine and one secondary amine functionality. A most preferred diamine is N-cyclohexyl-1,3-propane diamine. Because of the undesired reactivity of primary amines with polycarbonate resins, it is desirable that after reaction of the diamine compound with the polar group modified polyphenylene ether, substantially no primary amine functionality capable of reacting with the aromatic polycarbonate remain in the composition. The amount of diamine compound reacted with the polar group modified polyphenylene ether is from 0.05 to 2 weight percent, preferably 0.1 to 0.5 weight percent.

Preparation of polar group functionalized polyarylene ethers have been previously described in U.S. Pat. Nos. 3,375,228, 4,771,096 and 4,654,405, and generally involves the reaction of a suitable polar group containing reactant with a polyarylene ether at an elevated temperature, preferably in a melt of the polyarylene ether, under conditions to obtain homogeneous incorporation of the functionalizing reagent. Suitable temperatures are from 150° C. to 300° C. The reaction may be conducted in the presence of a free radical generator such as an organic peroxide or an organic hydroperoxide if desired.

The polyphenylene ethers are normally prepared by an oxidative coupling reaction of the corresponding bisphenol compound. Polyarylene ethers are a known class of polymers having been previously described in U.S. Pat. Nos. 3,306,874, 3,306,875, 3,257,357, and 3,257,358. A preferred polyarylene ether is poly(2,6-dimethyl-1,4-phenylene)ether. The teachings of all of the foregoing United States Patents are hereby incorporated in their entireties by reference thereto.

Suitable polar groups include the acid anhydrides, acid halides, acid amides, sulfones. oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether.

Polycarbonates for use as component (A) include both homopolymers and copolymers, such as copolyester carbonates, and include both linear and branched polymers, as well as mixtures of polymers. Preferred polycarbonates are homopolycarbonates based on bisphenol A, bisphenol AP and bisphenol fluorene, prepared, for example, by the reaction of such dihydroxy compound with phosgene. Preferred compositions comprise from 30 to 80 percent polycarbonate.

Syndiotactic vinylaromatic polymers for use as component (B) especially include syndiotactic polystyrene prepared by coordination polymerization of styrene monomer under conditions to provide a high degree of syndiotacticity. Most highly preferred are those polymers containing greater than 50 percent syndiotacticity at a racemic triad. Such polymers are known in the art having been previously disclosed in U.S. Pat. Nos. 4,680,353, 4,959,435, 4,950,724, 4,774,301, and elsewhere. Preferred compositions according to the invention comprise from 70 to 20 parts by weight syndiotactic vinylaromatic polymer.

In the preparation of a compatibilized blend according to the present invention, the syndiotactic vinylaromatic polymer, polar group modified polyphenylene ether and diamine are compounded and melt blended at a temperature sufficient to cause reaction of the diamine compound with the polar group modified polyphenylene ether and thorough melt blending of the resulting blend. In one embodiment of the invention the polar group modified polyphenylene ether and diamine compound may be reacted prior to addition of the syndiotactic vinylaromatic polymer. Generally blending in an extruder or suitable device at a temperature of 270° to 300° C. for several minutes is sufficient to cause blending of the various components and reaction of the diamine compound. If the diamine compound is reacted with the polar group modified polyphenylene ether prior to addition of the syndiotactic vinylaromatic polymer, the temperature of the operation may be from 150° to 300° C. depending on the softening point of the polyphenylene ether.

In addition to the syndiotactic vinylaromatic polymer, polar group modified polyphenylene ether and compatibilizer, additional components may of course be blended with the resulting compatibilized blend if desired. Additional additives include other polymers such as polyphenylene ethers, rubbers, particularly styrene butadiene copolymers and block copolymers, reinforcing aids such as glass fibers, carbon fibers, polymeric fibers, ceramic whiskers, etc., antioxidants, thermal stabilizers, fillers such as mica, talc, clay, etc.: lubricants, flow aids, pigments, etc. Such additives may be incorporated at the same time as the compatibilized blend is compounded or in a subsequent compounding step.

Having described the invention the following examples are provided as illustrative and are not to be construed as limiting. Unless stated to the contrary all parts and percentages are based on weight.

EXAMPLE 1

Syndiotactic polystyrene, 1,1-bis(4-hydroxyphenyl)-1-phenylethane polycarbonate (bisphenol AP polycarbonate), and maleic anhydride modified polyphenylene ether containing 5 percent maleic anhydride (MAPPO) were blended in the ratio of 50/45/5 along with N-cyclohexyl-1,3-propane diamine (0.5 percent based on total blend weight). The procedure involved blending syndiotactic polystyrene, MAPPO and the diamine at 280° C. in an extruder operating at 200 rpm for 2 minutes. Thereafter the polycarbonate was added and the mixture blended 5 additional minutes at 280° C.

Specimens prepared from the blend were examined by scanning electron microscopy. The blend had a dispersed phase of polycarbonate containing small domains of syndiotactic polystyrene. Impact resistance compared to unmodified blends of syndiotactic polystyrene and polycarbonate was improved.

EXAMPLE 2

The conditions of Example 1 were repeated employing 9,9-bis(4-hydroxyphenyl)fluorene polycarbonate (bisphenol fluorene polycarbonate). Morphology similar to that of Example 1 was observed and the blend demonstrated improved impact resistance compared to an uncompatibilized blend of syndiotactic polystyrene and polycarbonate.

What is claimed is:

1. A polymer comprising the reaction product of a $C_{2-18}$ organic diamine compound and a polar group modified polyphenylene ether, said diamine containing one primary amine and one secondary amine functionality.

2. A compatibilizer polymer according to claim 1 wherein the polar group modified polyphenylene ether is maleic anhydride modified poly(2,6-dimethyl-1,4-phenylene)ether.

3. A compatibilizer polymer according to claim 1 wherein the diamine is a $C_{2-18}$ aliphatic diamine containing one primary amine and one secondary amine functionality.

4. A compatibilizer polymer according to claim 3 wherein the diamine is N-cyclohexyl-1,3-propane diamine

* * * * *